US012153947B2

(12) United States Patent
Hamada (10) Patent No.: US 12,153,947 B2
(45) Date of Patent: Nov. 26, 2024

(54) ASSIGNMENT CONTROL DEVICE, ASSIGNMENT CONTROL METHOD, AND ASSIGNMENT CONTROL PROGRAM

(71) Applicant: Nippon Telegraph and Telephone Corporation, Tokyo (JP)

(72) Inventor: Makoto Hamada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 464 days.

(21) Appl. No.: 17/619,335

(22) PCT Filed: Jun. 27, 2019

(86) PCT No.: PCT/JP2019/025719
§ 371 (c)(1),
(2) Date: Dec. 15, 2021

(87) PCT Pub. No.: WO2020/261514
PCT Pub. Date: Dec. 30, 2020

(65) Prior Publication Data
US 2022/0365803 A1    Nov. 17, 2022

(51) Int. Cl.
*G06F 9/455* (2018.01)
*G06F 9/50* (2006.01)

(52) U.S. Cl.
CPC ........ *G06F 9/45558* (2013.01); *G06F 9/5027* (2013.01)

(58) Field of Classification Search
CPC ............................ G06F 9/45558; G06F 9/5027
See application file for complete search history.

(56) References Cited

U.S. PATENT DOCUMENTS

2016/0224362 A1* 8/2016 Tsirkin ................ G06F 9/45558
2018/0284869 A1* 10/2018 He .......................... G06F 1/206

FOREIGN PATENT DOCUMENTS

| JP | 2016055455 | 4/2016 |
|----|------------|--------|
| JP | 2018037047 | 3/2018 |
| WO | WO 2018163280 | 9/2018 |

OTHER PUBLICATIONS

[No Author Listed] [online], "OpenStack Documentation—CPU Topologies," OpenStack.org, dated Apr. 10, 2021, retrieved on Nov. 24, 2021, retrieved from URL <https://docs.openstack.org/nova/pike/admin/cpu-topologies.html>, 6 pages.

* cited by examiner

*Primary Examiner* — Gregory A Kessler
(74) *Attorney, Agent, or Firm* — Fish & Richardson P.C.

(57) ABSTRACT

An allocation control apparatus (1) includes a virtual core allocation unit (112) configured to allocate, out of a virtual core which is created on a virtual machine and occupies a physical core and a virtual core which is created on the virtual machine and shares a physical core, a task whose priority is equal to or greater than a threshold to a virtual core, and an interrupt core allocation unit (113) configured to allocate the virtual core to which the task is allocated as an interrupt destination of a virtual network interface card used by the task.

11 Claims, 6 Drawing Sheets

ASSIGNMENT CONTROL DEVICE, ASSIGNMENT CONTROL METHOD, AND ASSIGNMENT CONTROL PROGRAM

CROSS-REFERENCE TO RELATED APPLICATIONS

This application is a National Stage application under 35 U.S.C. § 371 of International Application No. PCT/JP2019/025719, having an International Filing Date of Jun. 27, 2019. The disclosure of the prior application is considered part of the disclosure of this application, and is incorporated in its entirety into this application.

TECHNICAL FIELD

The present disclosure relates to an allocation control apparatus, an allocation control method, and an allocation control program.

BACKGROUND ART

Replacing a physical server with a virtual computer system is called virtualization. When the processing of network functions and the like is virtualized (converted into software), the performance and quality of the processing of the network functions and the like may not be maintained due to the switching of central processing unit (CPU) resources by the scheduler, and the like. For this reason, it is necessary to assign virtual CPUs (virtual cores) to fixed physical CPUs (physical cores). This is called fixed assignment of CPU resources.

However, in a virtual computer system that automatically dispenses virtual resources in response to virtual resource requests from end users, the fixed assignment of CPU resources cannot be automatically performed. For this reason, for example, NPTL 1 discloses a method of assigning a CPU resource in a fixed manner by setting the range in which a virtual CPU is allocated to a physical CPU in the vcpu_pin_set parameter of the configuration file in OpenStack. In addition, PTL 1 describes disclosures of a resource assignment apparatus, a resource assignment method, and a resource assignment program that can change the assignable physical CPU (CPU core) for each virtual resource and can perform fixed assignment of virtual resources as part of automatic dispensing.

CITATION LIST

Patent Literature

PTL 1: JP 2018-037047 A

Non Patent Literature

NPTL 1: OpenStack Foundation "Openstack Documentation—CPU topologies", [online], THIS PAGE LAST UPDATED: 2018-10-16 17:41:17, [searched on 2019/6/26], the Internet <URL:https://docs.openstack.org/nova/latest/admin/cpu-topologies.html>

SUMMARY OF THE INVENTION

Technical Problem

The disclosure described in PTL 1 proposes to ensure the performance by controlling the CPU resource allocation while sharing it based on the correspondence relationship between virtual cores (virtual CPUs) and physical cores (physical CPUs) in the resource assignment (allocation) of virtual machines. However, the disclosure does not take into account the allocation of physical cores and interrupt cores (virtual cores) of virtual network interface cards of the virtual machine. Therefore, if physical cores are shared among virtual machines and the allocation cores of virtual network interface cards are included, the performance of the virtual cores and the tasks allocated to these virtual cores may not be ensured under the influence of other virtual machines.

Therefore, in the case where only a required virtual core in a virtual machine is fixed to occupy the processing while the others are shared, the interrupt cores are allocated in a shared manner, and the performance cannot be ensured due to the influence of the load of other virtual machines.

In addition, Virtio, which is commonly used as a virtual network interface card, performs interrupt processing to transfer packets to tasks on a virtual machine. The virtual core that is the interrupt destination of the virtual network interface card is fixed by the CPU interrupt affinity ( ) setting of the OS. As the number of virtual machines increases, the number of virtual cores that share a physical core increases, and the load on the physical core and each virtual core that shares the physical core increases. The increased load on the virtual cores affects the packet transfer processing by interrupts of the virtual network interface card.

The allocation core of the virtual network interface card of a virtual machine may not be determined at the time of starting the virtual machine, and may be determined along with the allocation of the virtual network interface card after the virtual machine is started. When a virtual machine is deployed and a guest OS is started on this virtual machine, the virtual core of the interrupt destination of the virtual network interface card is determined. Therefore, the virtual core of the interrupt destination of the virtual network interface card whose predetermined performance is desired to be ensured may share a physical core with another virtual core. At this time, if the load of the other virtual core increases, the load of the physical core shared by that virtual core may increase and the packet transfer performance may be affected.

In view of this, an object of the present disclosure is to provide an allocation control apparatus, an allocation control method, and an allocation control program that ensure the packet transfer performance of a task whose priority is equal to or greater than a threshold.

Means for Solving the Problem

To achieve the above-described object, an allocation control apparatus of an embodiment of the present disclosure includes a virtual core allocation unit configured to allocate, out of a first virtual core and a second virtual core, a task whose priority is equal to or greater than a threshold to the first virtual core, the first virtual core being created on a virtual machine and occupying a physical core, the second virtual core being created on the virtual machine and sharing a physical core, and an interrupt core allocation unit configured to allocate the first virtual core to which the task is allocated as an interrupt destination of a virtual network interface card used by the task.

Other solutions will be described in the embodiment of the disclosure.

Effects of the Invention

According to the present disclosure, it is possible to ensure the packet transfer performance of a task whose priority is equal to or greater than a threshold.

DESCRIPTION OF EMBODIMENTS

Figure 1:
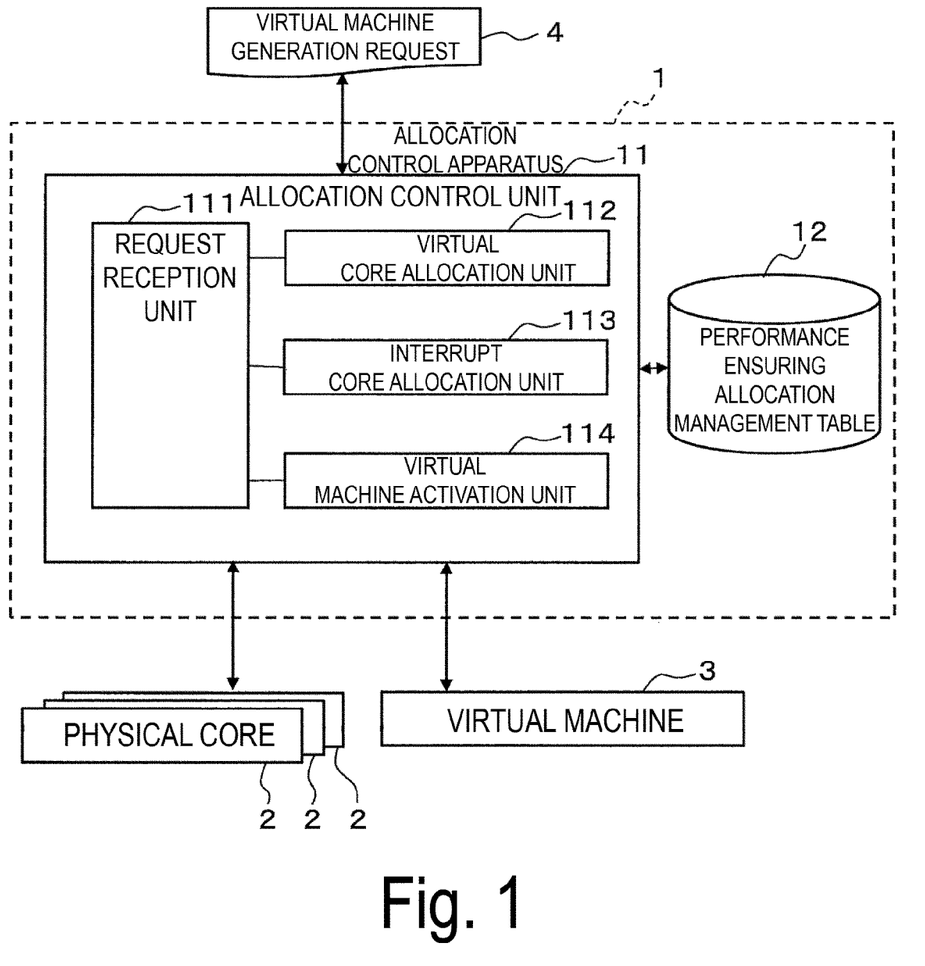
FIG. 1 is a drawing illustrating a configuration of an allocation control system according to the present embodiment.

An embodiment of present disclosure is described below with reference to the drawings. FIG. 1 is a drawing illustrating a configuration of an allocation control system according to the present embodiment.
The allocation control system includes an allocation control apparatus 1, a plurality of physical cores 2, and a virtual machine 3. On the basis of a virtual machine generation request 4 received from a higher-level device not illustrated in the drawing, the allocation control system activates the virtual machine 3 using the allocation control apparatus 1, and allocates each physical core 2 to each virtual core that constitutes the virtual machine 3. The allocation control apparatus 1 ensures the packet transfer processing performance of a task by allocating the interrupt destination of the virtual network interface card used by the task to an appropriate virtual core.

Figure 3:
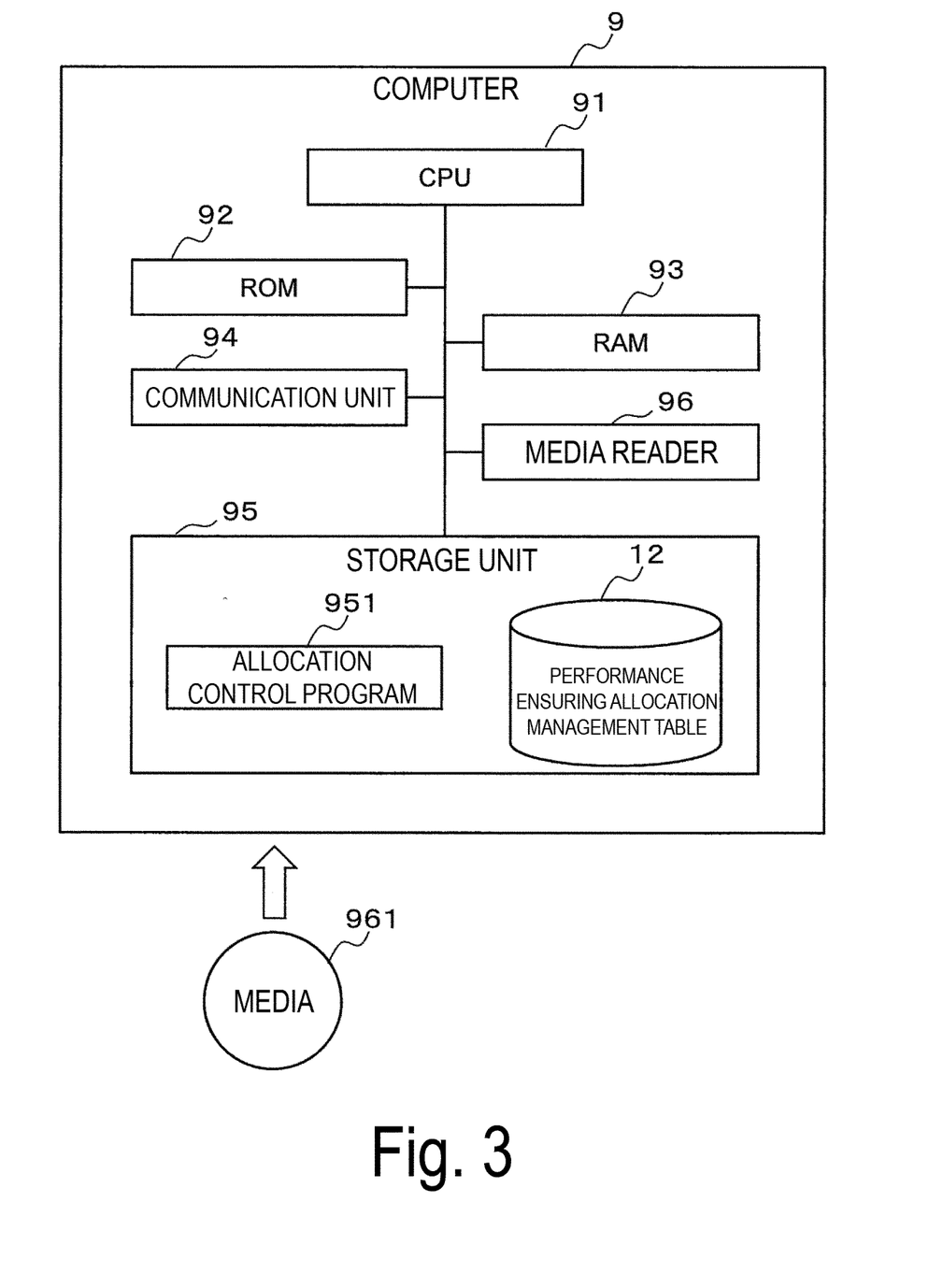
FIG. 3 is a drawing illustrating an example of a computer for implementing an allocation control apparatus.

As illustrated in FIG. 3, the allocation control apparatus 1 is implemented when a computer 9, which includes a CPU 91 and a random access memory (RAM) 93, a read only memory (ROM) 92, a communication unit 94, a storage unit 95 and a media reader 96, executes an allocation control program 951. The communication unit 94 transmits and receives information to and from other apparatuses through a network. The storage unit 95 stores the allocation control program 951 and a performance ensuring allocation management table 12 which is illustrated in FIG. 1. The allocation control program 951 is installed in the computer 9 by inserting a media 961 storing an installer of the allocation control program 951 to the media reader 96.
Note that the allocation control apparatus 1 may be implemented by a hardware logic, and is not limited to a configuration in which the computer 9 executes the allocation control program 951.

The physical core 2, which is a resource of a physical central processing unit (CPU), reads a program (execution code), stores each variable using a RAM not illustrated in the drawing as a work area, and performs a predetermined operation on each variable. The virtual machine 3 is an emulated virtual computer, and is created by a virtual machine activation unit 114 described below.

The allocation control apparatus 1 includes an allocation control unit 11 and the performance ensuring allocation management table 12. The allocation control unit 11 activates the virtual machine 3, and allocates each component of the virtual machine 3 by referring to the performance ensuring allocation management table 12.

The performance ensuring allocation management table 12 is a table that describes a correspondence relationship between each task to be subjected to the performance ensuring processing, the virtual core to which the task is allocated, and the virtual network interface card used by the task. The packet transfer performance of a task whose priority is equal to or greater than a threshold can be ensured by defining the performance ensuring allocation management table 12 in advance by the user. Details of the performance ensuring allocation management table 12 will be described below with reference to FIG. 2.

The allocation control unit 11 includes a request reception unit 111, the virtual machine activation unit 114, an interrupt core allocation unit 113, and a virtual core allocation unit 112. The request reception unit 111 receives the virtual machine generation request 4 from a higher-level device not illustrated in the drawing, and makes a series of requests related to the generation of the virtual machine 3 to the virtual machine activation unit 114, the interrupt core allocation unit 113, and the virtual core allocation unit 112.

In accordance with the request of the request reception unit 111, the virtual machine activation unit 114 generates and activates the virtual machine 3. In accordance with the request of the request reception unit 111, the virtual core allocation unit 112 allocates the virtual core that constitutes the virtual machine 3 to any of the plurality of physical cores 2.

Out of a first virtual core which is created on the virtual machine 3 and occupies the physical core 2 and a second virtual core which is created on the virtual machine 3 and shares the physical core 2, the virtual core allocation unit 112 allocates a task whose priority is equal to or greater than a threshold to the first virtual core. Further, the virtual core allocation unit 112 has a function of allocating a task whose priority is equal to or greater than a threshold to the first virtual core which is created on the virtual machine 3 and occupies the physical core 2 after the virtual machine 3 is activated or/and reactivated on a compute including the plurality of physical cores 2.

In accordance with the request of the request reception unit 111, the interrupt core allocation unit 113 allocates a virtual network interface card that constitutes the virtual machine 3 to any of a plurality of virtual cores. More specifically, the interrupt core allocation unit 113 allocates the first virtual core to which a task whose priority is equal to or greater than a threshold is allocated, as the interrupt destination of the virtual network interface card used by the task.

Figure 2:
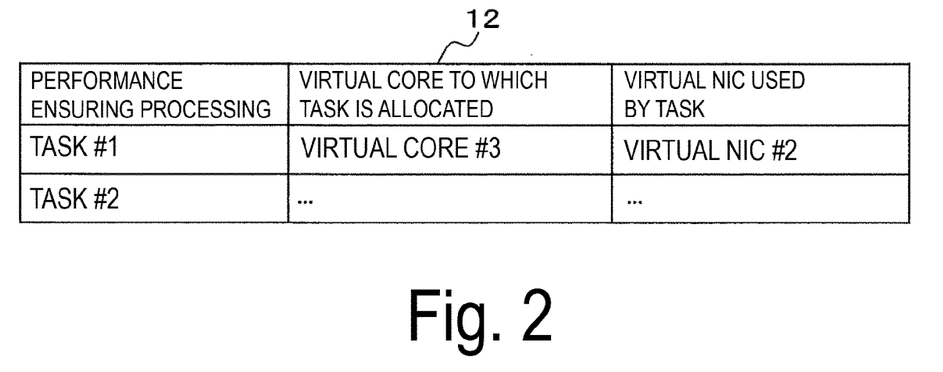
FIG. 2 is a drawing illustrating an example of a performance ensuring allocation management table.

FIG. 2 is a drawing illustrating an example of the performance ensuring allocation management table 12.
More specifically, the performance ensuring allocation management table 12 is stored in the storage unit 95 of the computer 9 (see FIG. 3) that constitutes the allocation control apparatus 1. The performance ensuring allocation management table 12 is a table that describes a correspondence relationship between each task to be subjected to the performance ensuring processing, the virtual core to which the task is allocated, and the virtual network interface card used by the task. FIG. 2 describes that a task #1 is allocated to a virtual core #3, and the task uses a virtual network interface card #2. The allocation control unit 11 allocates each component of the virtual machine 3 by referring to the performance ensuring allocation management table 12.

Note that in the following drawings, each virtual network interface card is abbreviated to "virtual NIC". The task #1 of FIG. 2 is a task 7 illustrated in FIGS. 5 to 7. The virtual core #3 of FIG. 2 is a virtual core 5-3 illustrated in FIGS. 5 to 7. The virtual network interface card #2 is a virtual network interface card 6-2 illustrated in FIGS. 5 to 7.

Figure 4:
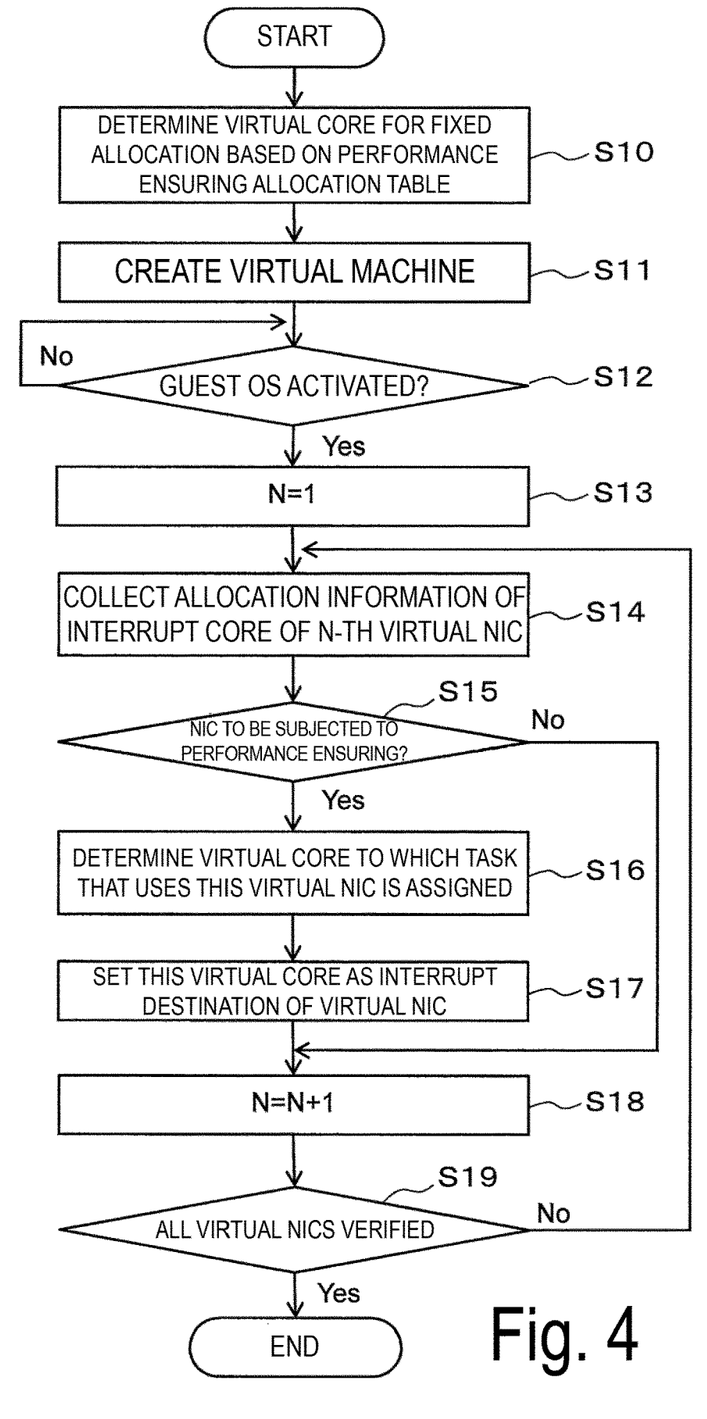
FIG. 4 is a flowchart of allocation control processing.

FIG. 4 is a flowchart of allocation control processing. The allocation control unit 11 determines a virtual core (the first virtual core) for fixed allocation on the basis of the performance ensuring allocation management table 12 set in advance (S10). The allocation control unit 11 passes the virtual core for fixed allocation to the virtual machine activation unit 114 as a parameter in generation of the virtual machine 3, and the virtual machine activation unit 114 generates (deploys) the virtual machine 3 (S11).

More specifically, when the allocation control apparatus 1 executes an openstack server create command, the virtual machine 3-1 is generated (deployed). Details of the openstack server create command are described in the Internet <URL:https://docs.openstack.org/python-openstackclient/latest/cli/command-objects/server.html>.

Specifically, the virtual machine 3-1 creates virtual cores 5-1 to 5-3 and virtual network interface cards 6-1 and 6-2 that constitute the virtual machine 3-1. Thereafter, for example, the allocation control apparatus 1 uses a Domain XML format of libvirt such that the virtual machine 3-1 is activated in the state illustrated in FIG. 5 with regard to the occupancy and sharing of the physical cores. Details of the Domain XML format of libvirt are described in the Internet <URL:https://libvirt.org/formatdomain.html #elementsCPUAllocation>.

Figure 5:
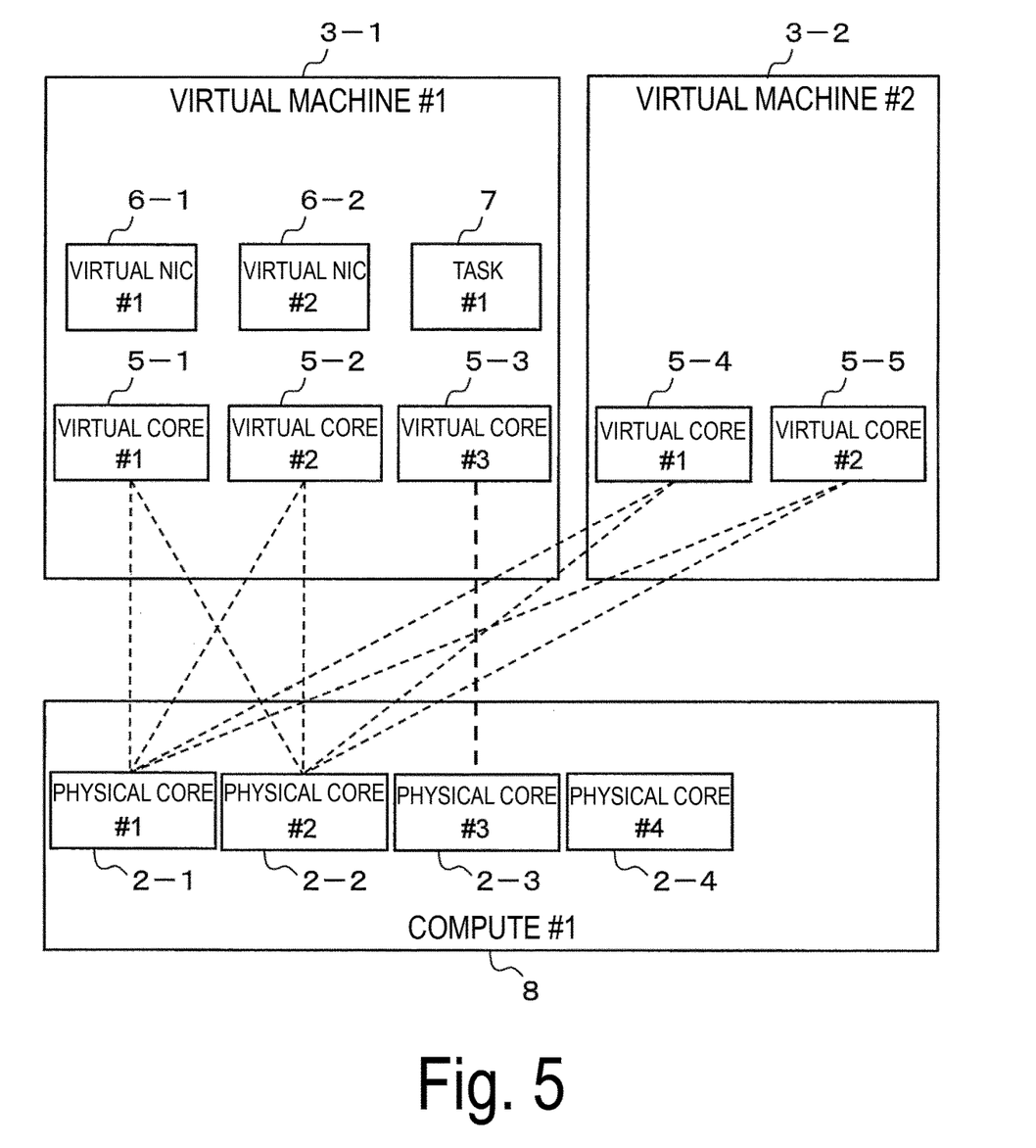
FIG. 5 is a drawing illustrating a state immediately after an activation of a guest OS.

The allocation control apparatus 1 designates a plurality of physical cores 5-1 and 5-2 to the CPU Allocation of the virtual machines 5-1 and 5-2 through the use of the Domain XML format of libvirt. Through internal OS initialization processing, the physical cores 2-1 and 2-2 are allocated to the virtual core 5-1 and the virtual core 5-2 in a shared manner. The virtual cores 5-1 and 5-2 are second virtual cores that share a physical core.

The allocation control apparatus 1 designates a single physical core 5-3 to the CPU Allocation of the virtual machine 5-3 through the use of the Domain XML format of libvirt. Through internal OS initialization processing, the physical core 2-3 is allocated to the virtual core 5-3 in a fixed manner. The virtual core 5-3 is the first virtual core that occupies the physical core 2-3. The state of the virtual machine 3-1 at this time will be described below with reference to FIG. 5.

In this manner, the number of the virtual cores 5 in the virtual machine 3-1, the attribute of the virtual network interface card 6 in the virtual machine 3-1, and the fixed/shared allocation of the physical core to the virtual core in the virtual machine 3-1 are designated.

Note that the allocation control apparatus 1 is not limited to the Domain XML format of libvirt, and may activate the virtual machine 3-1 by designating the Domain XML format with a virt-install command of kvm. In addition, an operator may manually designate the occupancy and sharing of each of the physical cores 2-1 to 2-3 after an openstack server create command is executed, and the method is not limited.

After the virtual machine 3 is generated at step S11, the guest OS (not illustrated in the drawing) of the virtual machine 3-1 determines the interrupt core (virtual core 5) of each of the virtual network interface cards 6-1 and 6-2. Here, the guest OS refers to an operating system that is operated on the environment of the virtual machine 3-1. Here, the guest OS sets the interrupt destination of the virtual network interface card 6-2 as the virtual core 5-2 in generation (deploy) of the virtual machine 3-1. The state of the virtual machine 3-1 at this time will be described below with reference to FIG. 6.

Note that the guest OS does not uniquely select the virtual core 5-2 as the interrupt destination of the virtual network interface card 6-2.

Figure 6:
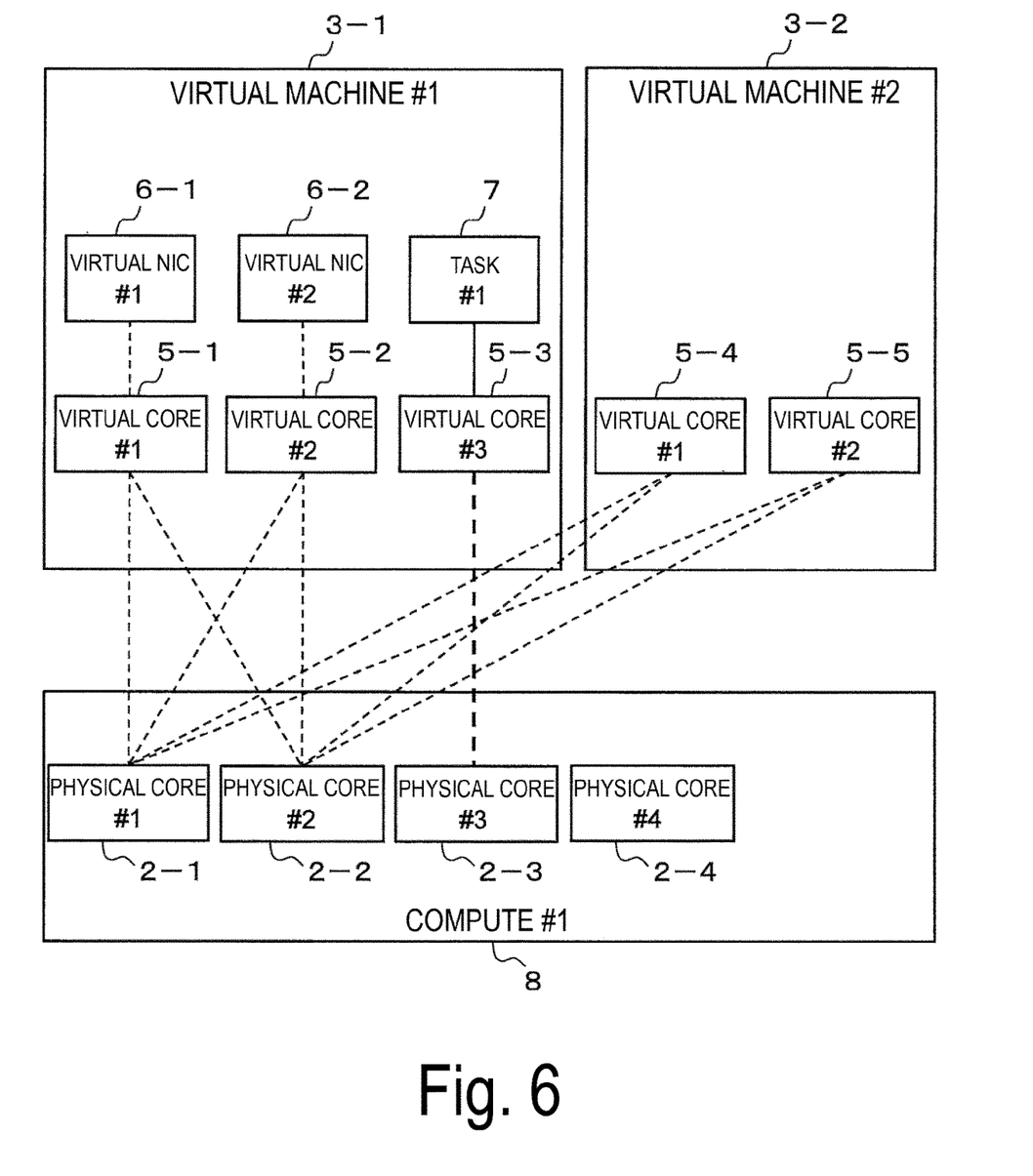
FIG. 6 is a drawing illustrating a state where an interrupt of each virtual network interface card is allocated to each virtual core.

After step S11, the virtual machine activation unit 114 monitors the generation of the virtual machine 3-1 illustrated in FIG. 6, and determines whether activation of the guest OS on the virtual machine 3-1 is detected (S12). Here, the virtual machine activation unit 114 repeats the determination at step S12 when the virtual machine activation unit 114 does not detect activation of the guest OS (No), whereas the virtual machine activation unit 114 proceeds to step S13 when the virtual machine activation unit 114 detects activation of the guest OS (Yes).

Note that the virtual machine activation unit 114 is not limited to the activation of the guest OS on the virtual machine 3-1 and may detect reactivation of the guest OS.

At step S13, the interrupt core allocation unit 113 initializes a variable N with 1. Out of each of the virtual network interface cards 6-1 and 6-2 created in generation of the virtual machine 3-1, the interrupt core allocation unit 113 collects the allocation information of the interrupt core of the N-th virtual network interface card 6.

At step S15, the interrupt core allocation unit 113 determines whether the N-th virtual network interface card 6 is to be subjected to performance ensuring. The interrupt core allocation unit 113 determines that the virtual network interface card 6 is to be subjected to the performance ensuring when a task to be subjected to the performance ensuring processing is allocated to the virtual core 5 occupying any of the physical cores 2 and the task uses the virtual network interface card 6.

At step S15, when the virtual network interface card 6 is not to be subjected to the performance ensuring (No), the interrupt core allocation unit 113 proceeds to step S18. When the virtual network interface card 6 is to be subjected to the performance ensuring (Yes), the interrupt core allocation unit 113 proceeds to step S16.

More specifically, the second virtual network interface card 6-2 illustrated in FIG. 6 is indicated as the virtual network interface card used by the task 7 to be subjected to the performance ensuring processing in the first record of the performance ensuring allocation management table 12. The task 7 is allocated to the virtual core 5-3 that occupies the physical core 2-3.

Accordingly, the interrupt core allocation unit 113 determines that the virtual network interface card 6-2 is to be subjected to the performance ensuring. Specifically, the interrupt core allocation unit 113 sets, as a subject of change, the allocation destination of the IRQ interrupt core affinity of the virtual network interface card 6-2.

At step S16, the interrupt core allocation unit 113 determines the virtual core 5 to which the task 7 that uses the virtual network interface card 6 to be subjected to the performance ensuring is assigned. Further, the interrupt core allocation unit 113 sets this virtual core 5 as the interrupt destination of the virtual network interface card 6 (S17), and proceeds to the processing of step S18.

Figure 7:
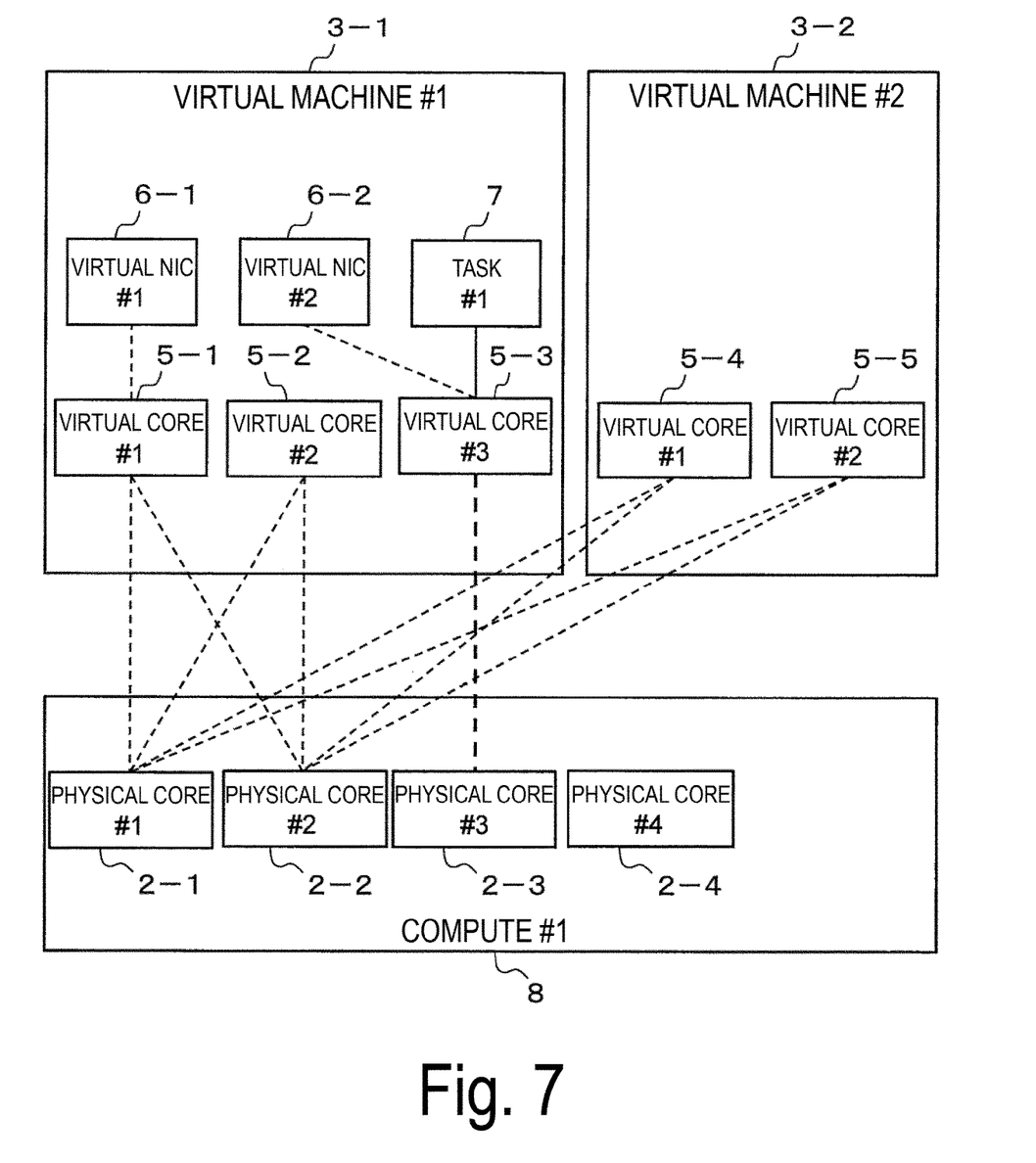
FIG. 7 is a drawing illustrating a state where an interrupt destination of a virtual network interface card used by a task is allocated to a virtual core to which the task is allocated.

More specifically, the interrupt core allocation unit 113 determines the virtual core 5-3 to which with the task 7 is assigned and verifies allocation, to the physical cores 2-1 and 2-2, of the virtual core 5-2 that is the interrupt destination of the virtual network interface card 6-2. When it is verified that the virtual core 5-2 that is the interrupt destination of the virtual network interface card 6-2 and the physical cores 2-1 and 2-2 are different from the virtual core 5-3 to which the task 7 is allocated and the physical core 2-3 occupied by the virtual core 5-3, the allocation destination is changed to the virtual core 5-3 used by the same task 7 on the basis of the performance ensuring allocation management table 12. When the interrupt core is allocated to the virtual core 5-3 that processes the same task 7, it is not influenced by the processing of the virtual machine 3-2, and thus the task 7 can ensure the packet transfer performance.

Note that the interrupt core allocation unit 113 may determine whether the virtual core 5-2 that is the interrupt destination of the virtual network interface card 6-2 matches the virtual core 5-3 to which the same task 7 is allocated without verifying the correspondence relationship of the virtual core 5-2 and the physical cores 2-1 to 2-4.

At step S18, the interrupt core allocation unit 113 adds 1 to the variable N. Then, the interrupt core allocation unit 113 determines whether all virtual network interface cards 6 have been verified (S19). More specifically, the interrupt core allocation unit 113 determines that all virtual network interface cards 6 have been verified when the variable N exceeds the number of the virtual network interface cards 6. At step S19, when all virtual network interface cards 6 have not been verified (No), the interrupt core allocation unit 113 returns to step S14. When all virtual network interface cards 6 have been verified (Yes), the interrupt core allocation unit 113 terminates the processing of FIG. 4.

FIG. 5 is a drawing illustrating a state immediately after an activation of a guest OS. A compute 8 includes the physical cores 2-1 to 2-4. On the compute 8, the virtual machines 3-1 and 3-2 are generated (deployed) and implemented. The virtual machine 3-2 includes virtual cores 5-4 and 5-5. Each of the virtual cores 5-4 and 5-5 shares the physical cores 2-1 and 2-2.

The virtual machine 3-1 includes the virtual cores 5-1 to 5-3, the virtual network interface cards 6-1 and 6-2, and the task 7. Each of the virtual cores 5-1 and 5-2 shares the physical cores 2-1 and 2-2. The virtual core 5-3 occupies the physical core 2-3.

Note that the state illustrated in FIG. 5 is established also immediately after reactivation of the guest OS.

FIG. 6 is a drawing illustrating a state where the interrupt destinations of the virtual network interface cards 6-1 and 6-2 are allocated to the virtual cores 5-1 to 5-3.

The interrupt destination of the virtual network interface card 6-1 is allocated to the virtual core 5-1. The interrupt destination of the virtual network interface card 6-2 is allocated to the virtual core 5-2. Here, when the load of the virtual machine 3-2 increases, the loads of the physical cores 2-1 and 2-2 increase, and consequently the performances of the virtual cores 5-1 and 5-2 may be reduced.

FIG. 7 is a drawing illustrating a state where the interrupt of the virtual network interface card 6-2 used by the task 7 is allocated to the virtual core 5-3 to which the task 7 is assigned.

To ensure the packet transfer performance of the task 7 whose priority is equal to or greater than the threshold, the virtual core 5-3 that occupies the physical core 2-3 is allocated as the interrupt core of the virtual network interface card 6-2. In this manner, the task 7 does not influenced by the load of the virtual machine 3-2.

In the present embodiment, the resource allocation of the virtual machine is performed in consideration of the interrupt core of the virtual network interface card. In this manner, even in a virtual machine in which a virtual core allocated in a fixed manner and a virtual core allocated in a shared manner are mixed, the packet transfer performance can be ensured without being influenced by the load of other virtual machines.

Configurations and Operational Effects of Above Embodiment (2) The allocation control apparatus according to (1), further includes a storage unit configured to store allocation information representing a relationship among the task that operates on the virtual machine and whose priority is equal to or greater than the threshold, the first virtual core that operates on the virtual machine and to which the task is allocated, and the virtual network interface card that operates on the virtual machine and is used by the task.

In this manner, the user can preliminarily set the allocation information of the task whose packet transfer performance should be ensured.

(3) The virtual core allocation unit of the allocation control apparatus according to (1) or (2) allocates, after the virtual machine is activated or/and reactivated on a compute including a plurality of physical cores, the task whose priority is equal to or greater than the threshold to the first virtual core which is created on the virtual machine and occupies the physical core.

(4) An allocation control method of the present embodiment includes allocating, out of a first virtual core which is created on a virtual machine and occupies a physical core and a second virtual core which is created on the virtual machine and shares a physical core, a task whose priority is equal to or greater than a threshold to a first virtual core, and allocating the first virtual core to which the task is allocated as an interrupt destination of a virtual network interface card used by the task.

In this manner, the allocation control method can ensure the packet transfer performance of the task whose priority is equal to or greater than the threshold.

(5) In the allocation control method according to (4), the task whose priority is equal to or greater than the threshold is allocated to the first virtual core on a basis of allocation information representing a relationship among the task that operates on the virtual machine and whose priority is equal to or greater than the threshold, the first virtual core that operates on the virtual machine and to which the task is allocated, and the virtual network interface card that operates on the virtual machine and is used by the task.

In this manner, the allocation control method can allocate the task whose priority is equal to or greater than the threshold to the first virtual core that occupies the physical core.

(6) In the allocation control method according to (5), on a basis of the allocation information, the first virtual core to which the task is allocated is allocated as the interrupt destination of the virtual network interface card used by the task.

In this manner, the allocation control method can ensure the packet transfer performance of the task whose priority is equal to or greater than the threshold.

(7) In the allocation control method according to any one of (4) to (6), after the virtual machine is activated or/and reactivated on a compute including a plurality of physical cores, the task whose priority is equal to or greater than the threshold is allocated to the first virtual core which is created on the virtual machine and occupies the physical core.

In this manner, the allocation control method can ensure the packet transfer performance of the task whose priority is equal to or greater than the threshold regardless of the state after the generation (deployment) of the virtual machine.

(8) An allocation control program is configured to cause a computer to execute a procedure of allocating, out of a first virtual core which is created on a virtual machine and occupies a physical core and a second virtual core which is created on the virtual machine and shares a physical core, a task whose priority is equal to or greater than a threshold to a first virtual core, and a procedure of allocating the first virtual core to which the task is allocated as an interrupt destination of a virtual network interface card used by the task.

In this manner, the allocation control program can ensure the packet transfer performance of the task whose priority is equal to or greater than the threshold.

REFERENCE SIGNS LIST

1 Allocation control apparatus
11 Allocation control unit
111 Request reception unit
112 Virtual core allocation unit
113 Interrupt core allocation unit
114 Virtual machine activation unit
12 Performance ensuring allocation management table
2, 2-1 to 2-4 Physical core (#1 to #4)
3, 3-1, 3-2 Virtual machine (#1, #2)
4 Virtual machine generation request
5-1 to 5-5 Virtual core (#1 to #5)
6-1, 6-2 Virtual network interface card (#1, #2)
7 Task (#1)
8 Compute (#1)
9 Computer
91 CPU
92 ROM
93 RAM
94 Communication unit
95 Storage unit
951 Allocation control program
96 Media reader
961 Media

The invention claimed is:

1. An allocation control apparatus comprising one or more processors configured to perform operations comprising:
storing allocation information representing a relationship among (i) a task, (ii) a first virtual core to which the task is allocated, and (iii) a virtual network interface card used by the task, wherein the task has a priority that is equal to or greater than a threshold;
allocating, out of the first virtual core and a second virtual core, the task to the first virtual core, wherein the first virtual core is created on a virtual machine and occupies a first physical core, the second virtual core is created on the virtual machine and shares a second physical core with another virtual core;
determining an interrupt destination of the virtual network interface card used by the task;
determining that the interrupt destination is different from the first virtual core; and
allocating the first virtual core as the interrupt destination of the virtual network interface card used by the task.

2. The allocation control apparatus according to claim 1, wherein the task, the first virtual core, and the virtual network interface card are operated on the virtual machine.

3. The allocation control apparatus according to claim 1, wherein the operations comprise:

after the virtual machine is activated or/and reactivated on a compute including a plurality of physical cores, allocating the task whose priority is equal to or greater than the threshold to the first virtual core which is created on the virtual machine and occupies the first physical core of the plurality of physical cores.

4. An allocation control method comprising:
storing allocation information representing a relationship among (i) a task, (ii) a first virtual core to which the task is allocated, and (iii) a virtual network interface card used by the task, wherein the task has a priority that is equal to or greater than a threshold;
allocating, out of the first virtual core and a second virtual core, the task to the first virtual core, wherein the first virtual core is created on a virtual machine and occupies a first physical core, the second virtual core is created on the virtual machine and shares a second physical core with another virtual core;
determining an interrupt destination of the virtual network interface card used by the task;
determining that the interrupt destination is different from the first virtual core; and
allocating the first virtual core as the interrupt destination of the virtual network interface card used by the task.

5. The allocation control method according to claim 4, wherein the task whose priority is equal to or greater than the threshold is allocated to the first virtual core based on allocation information representing the relationship among the task that operates on the virtual machine and whose priority is equal to or greater than the threshold, the first virtual core that operates on the virtual machine and to which the task is allocated, and the virtual network interface card that operates on the virtual machine and is used by the task.

6. The allocation control method according to claim 5, wherein based on the allocation information, the first virtual core to which the task is allocated is allocated as the interrupt destination of the virtual network interface card used by the task.

7. The allocation control method according to claim 4, wherein after the virtual machine is activated or/and reactivated on a compute including a plurality of physical cores, the task whose priority is equal to or greater than the threshold is allocated to the first virtual core which is created on the virtual machine and occupies the first physical core of the plurality of physical cores.

8. A non-transitory computer-readable medium storing one or more instructions that cause a computer to execute:
storing allocation information representing a relationship among (i) a task, (ii) a first virtual core to which the task is allocated, and (iii) a virtual network interface card used by the task, wherein the task has a priority that is equal to or greater than a threshold;
allocating, out of the first virtual core and a second virtual core, the task to the first virtual core, wherein the first virtual core is created on a virtual machine and occupies a first physical core, the second virtual core is created on the virtual machine and shares a second physical core with another virtual core;
determining an interrupt destination of the virtual network interface card used by the task;
determining that the interrupt destination is different from the first virtual core; and
allocating the first virtual core as the interrupt destination of the virtual network interface card used by the task.

9. The non-transitory computer-readable medium according to claim 8, wherein the task whose priority is equal to or greater than the threshold is allocated to the first virtual core based on allocation information representing the relationship among the task that operates on the virtual machine and whose priority is equal to or greater than the threshold, the first virtual core that operates on the virtual machine and to which the task is allocated, and the virtual network interface card that operates on the virtual machine and is used by the task.

10. The non-transitory computer-readable medium according to claim 9, wherein based on the allocation information, the first virtual core to which the task is allocated is allocated as the interrupt destination of the virtual network interface card used by the task.

11. The non-transitory computer-readable medium according to claim 8, wherein after the virtual machine is activated or/and reactivated on a compute including a plurality of physical cores, the task whose priority is equal to or greater than the threshold is allocated to the first virtual core which is created on the virtual machine and occupies the first physical core of the plurality of physical cores.

* * * * *